United States Patent [19]

Aldag

[11] Patent Number: 4,502,369
[45] Date of Patent: Mar. 5, 1985

[54] GRAIN STORAGE STRUCTURES
[75] Inventor: John Aldag, Chicago, Ill.
[73] Assignee: Bantam Systems, Inc., Chicago, Ill.
[21] Appl. No.: 353,184
[22] Filed: Mar. 1, 1982
[51] Int. Cl.³ .............................................. A01F 25/08
[52] U.S. Cl. .......................................... 98/56; 34/232; 98/52
[58] Field of Search ............................ 34/93, 232, 233; 52/579, 588; 98/51, 52, 54, 55, 56, 57

[56] References Cited

U.S. PATENT DOCUMENTS

| | | | |
|---|---|---|---|
| 2,643,602 | 6/1953 | Martin | 98/54 |
| 2,737,878 | 3/1956 | Maho | 98/55 |
| 3,033,098 | 5/1962 | Gacs | 98/56 |
| 3,044,182 | 7/1962 | Steffen | 98/55 X |
| 4,137,682 | 2/1979 | Trumper | 52/588 |

FOREIGN PATENT DOCUMENTS 5101  7/1920  Netherlands ............................ 98/52

Primary Examiner—Harold Joyce
Attorney, Agent, or Firm—Kinzer, Plyer, Dorn & McEachran

[57] ABSTRACT

A grain storage system for protecting and aerating a mass of stored grain comprises a floor enclosed by perforated sheet metal sidewalls which are supported on a series of support trusses and project outwardly at an angle from the periphery of the floor. A mass of stored grain rests on the floor. A first set of perforated aeration ducts extend across the floor, at the bottom of the grain mass, and a second set of perforated aeration ducts extend across the top of the grain mass, the grain and the second set of ducts being covered by a tarpaulin secured to the sidewalls. Fans are connected to one set of the ducts to circulate air through both sets of ducts and through the sidewalls; the two sets of aeration ducts are staggered with respect to one another so that air circulates throughout the entire grain mass.

12 Claims, 15 Drawing Figures

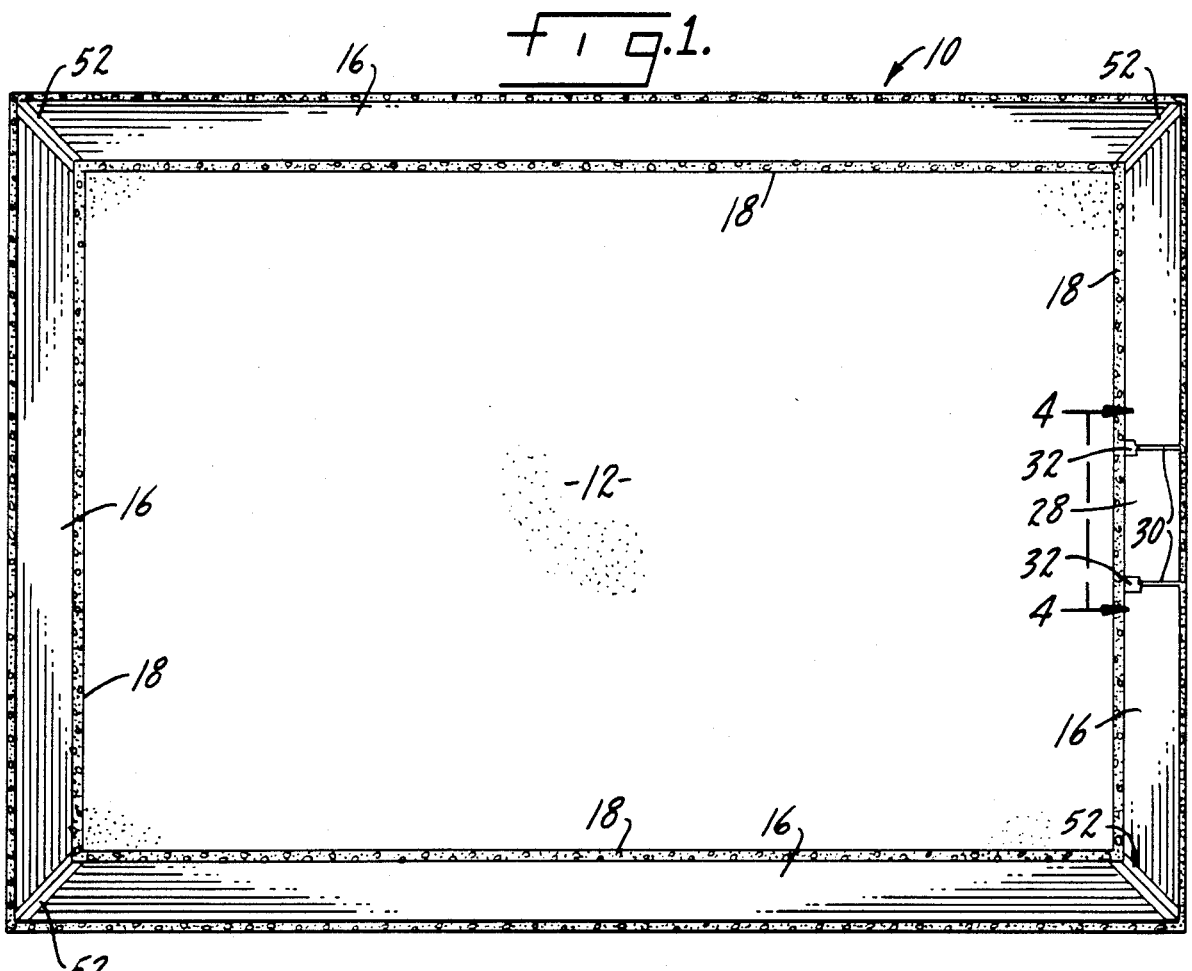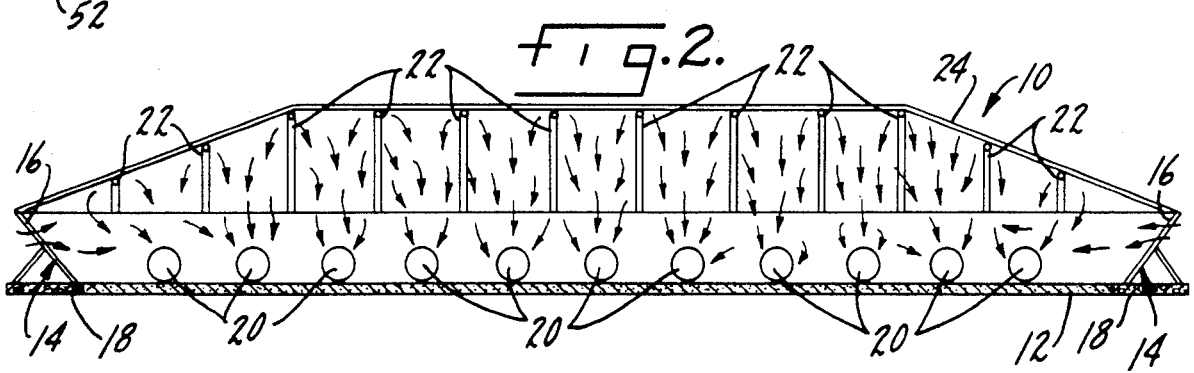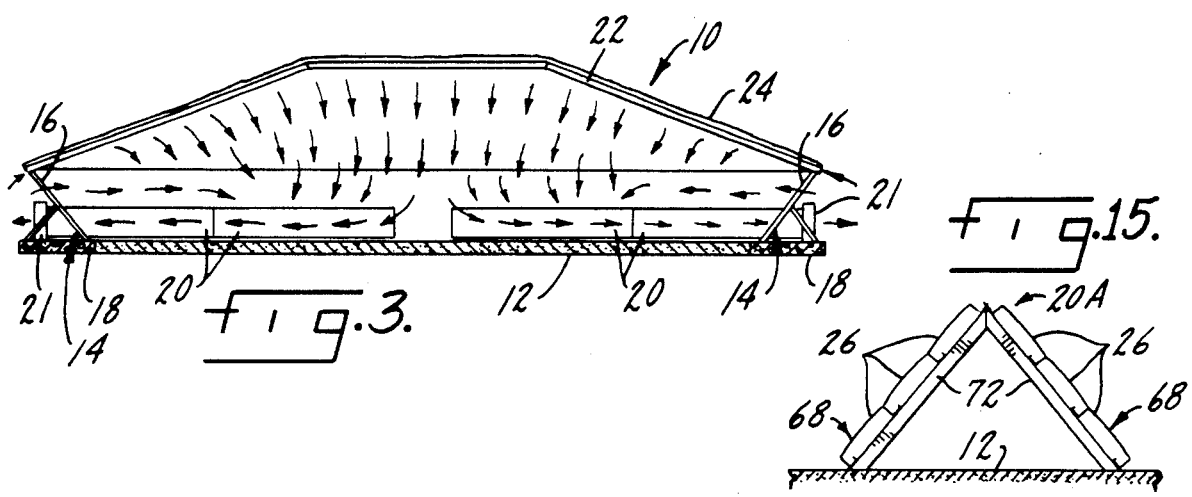

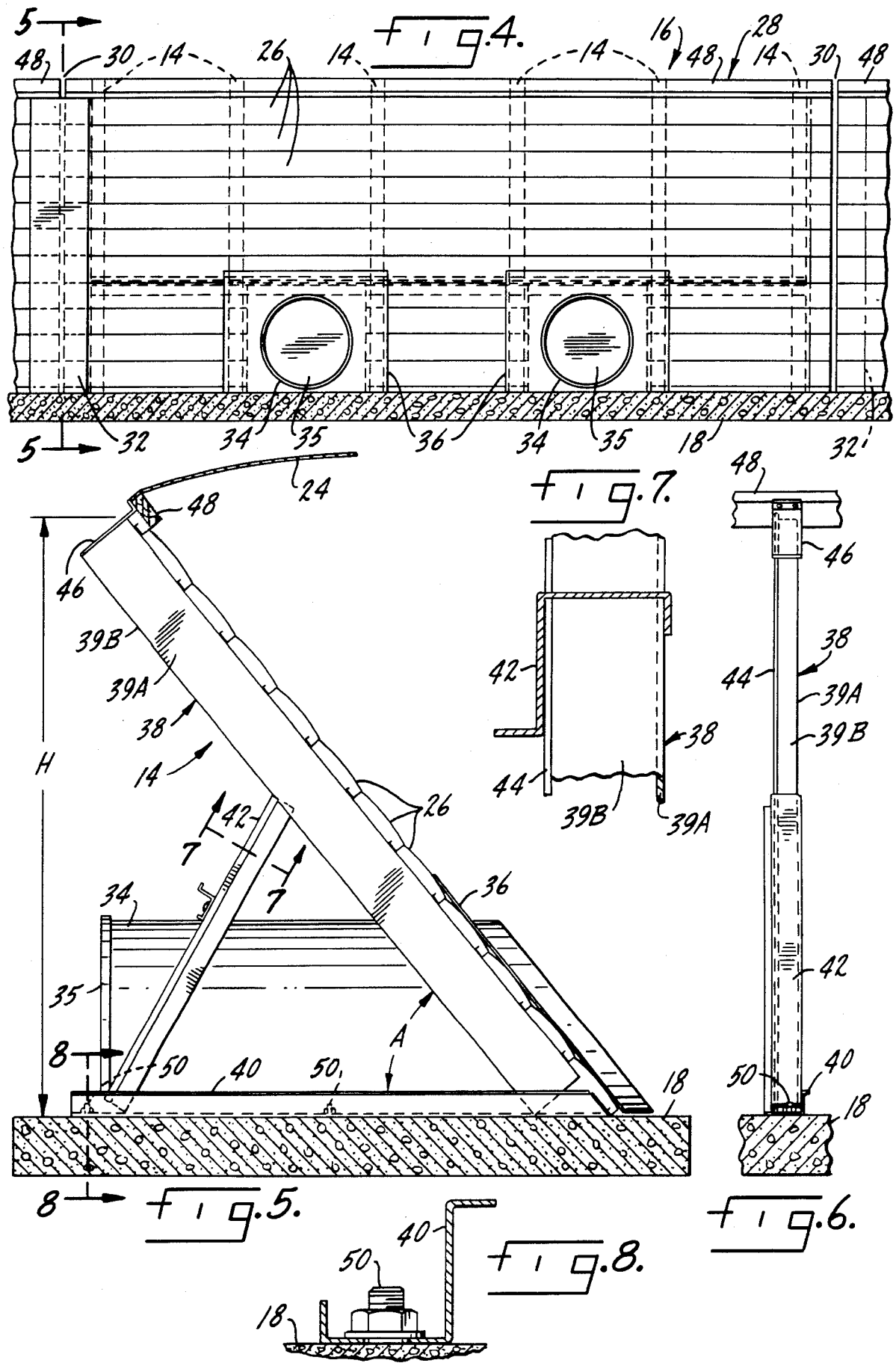

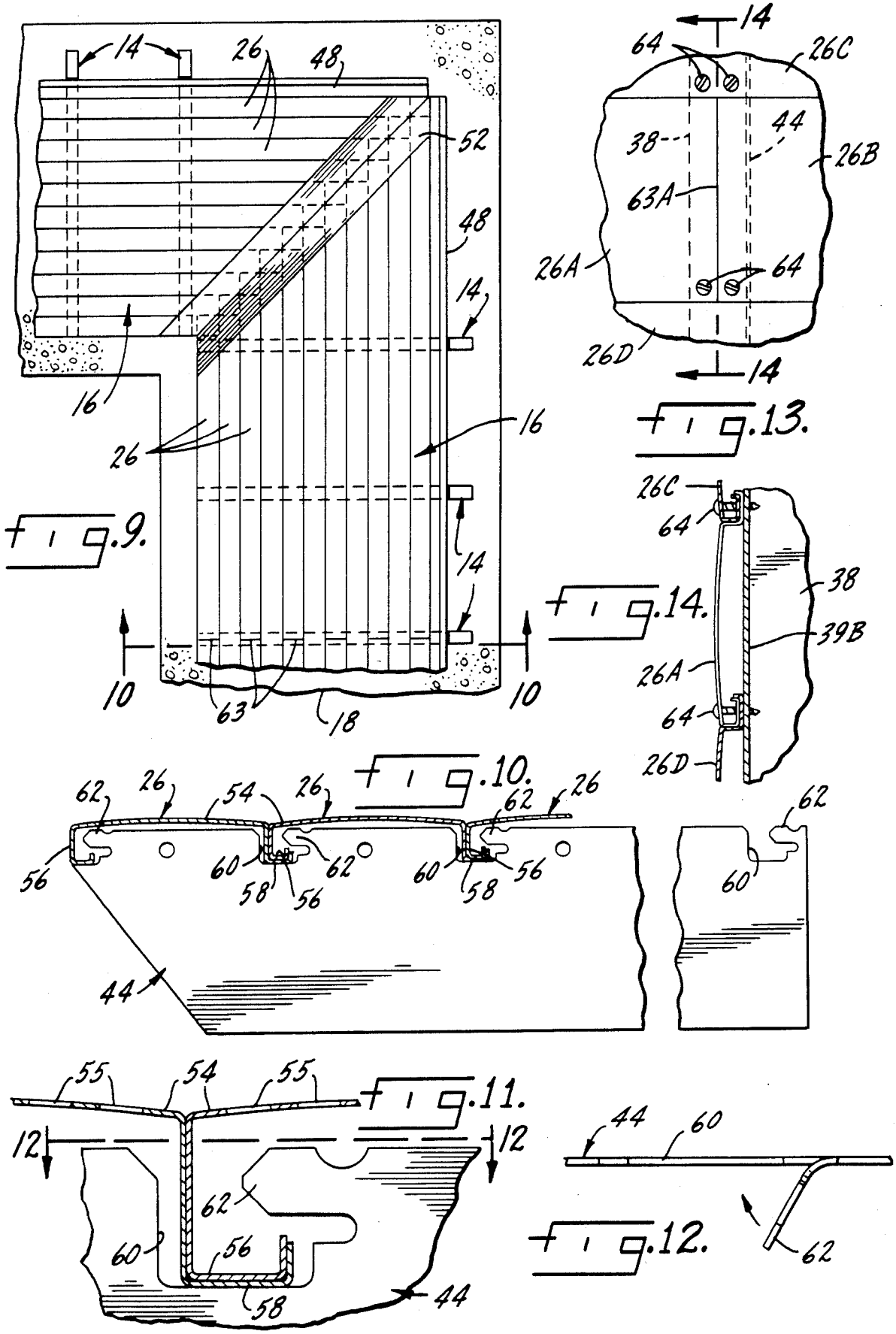

4,502,369

GRAIN STORAGE STRUCTURES

BACKGROUND OF THE INVENTION

This invention relates to grain storage and aeration systems. In the past grain storage and aeration systems have usually been based on relatively expensive buildings, having such features as raised flooring, rigid roofs, and complex ventilating systems; high volume systems have usually included complete loading and unloading devices. To conserve floor space, these buildings tend to be relatively tall. All of this leads to a grain storage and aeration system which is expensive to build and operate.

The present invention is concerned with an economical grain storage and aeration system which materially reduces capital expenditures and overall storage costs. The storage structure is based on components which can be fabricated in a central facility, readily shipped to the building site and erected with no heavy equipment or specialized tools. The system is particularly well-suited for short-term grain storage, but is sufficiently durable for long-term use.

SUMMARY OF THE INVENTION

An object of the invention is to provide a grain storage and aeration system made of components which can be fabricated in a central facility and easily shipped to a building site.

Another object is to provide a grain storage and aeration system which does not require the use of costly footings or foundations and can be erected without the use of heavy equipment or specialized tools.

Another object is to provide a grain storage and aeration system which, when not being used for grain storage can be used for other storage requirements.

Another object of the invention is to provide a ventilating duct for use in a grain storage and aeration system which can be fabricated in a central facility, shipped in a flat condition, and easily assembled at a building site.

The grain storage structure includes a floor and a series of support trusses at spaced locations around the periphery of the floor. A plurality of perforated sheet metal sidewalls are supported on the trusses. The sidewalls enclose a grain storage area on the floor, accommodating a mass of stored grain. A set of perforated lower aeration ducts extend across the storage area on the floor in spaced relation to each other, at the bottom of the grain mass. A set of perforated upper aeration ducts extend across the storage area at the top of the grain mass. A cover is secured to the sidewalls and overlies both the grain mass and the upper aeration ducts. Fan means are connected to one set of the ducts to circulate air through both sets of ducts and through the sidewalls and the grain mass, thereby aerating the entire grain mass.

BRIEF DESCRIPTION OF THE DRAWINGS

FIG. 1 is a plan view of a grain storage structure constructed in accordance with one embodiment of the invention, with the cover removed to expose the sidewalls and floor.

FIG. 2 is a schematic side elevation view of the grain storage structure of FIG. 1.

FIG. 3 is a schematic end elevation view of the grain storage structure of FIG. 1.

FIG. 4 is an elevation view, on an enlarged scale, of a door section of a sidewall, taken approximately along line 4—4 in FIG. 1.

FIG. 5 is a side elevation view, on an enlarged scale, of a support truss, taken approximately along line 5—5 in FIG. 4.

FIG. 6 is an end elevation view of the support truss of FIg. 5.

FIG. 7 is a detail section view taken along line 7—7 of FIG. 5.

FIG. 8 is a detail section view taken along line 8—8 of FIG. 5.

FIG. 9 is a plan view, on an enlarged scale, of one corner of the grain storage structure of FIG. 1.

FIG. 10 is a side view, on a further enlarged scale, of a support truss, taken approximately along line 10—10 of FIG. 9 and illustrating the attachment of the sidewall members to the truss.

FIG. 11 is an enlarged detail view showing a preferred notch and tab arrangement for securing the sidewall members to the truss.

FIG. 12 is a detail view taken approximately as indicated by line 12—12 in FIG. 11.

FIG. 13 is an enlarged detail view of a joint between two abutting members of the sidewall.

FIG. 14 is a detail section view taken along line 14—14 of FIG. 13.

FIG. 15 is an end elevation view of a preferred configuration for the lower aeration ducts in the grain storage structure of FIG. 1.

DESCRIPTION OF A PREFERRED EMBODIMENT

A grain storage and aeration system 10 for protecting a mass of stored grain, comprising a preferred embodiment of the invention, is generally illustrated in FIGS. 1-3. The system includes a floor 12 which is preferably paved with asphalt or concrete; however, the floor 12 could simply be bare, packed earth. A series of support trusses 14 (FIGS. 2 and 3) are placed at spaced locations around the periphery of the floor 12. A plurality of perforated, sheet metal sidewalls 16 are supported on the trusses 14. The sidewalls enclose a grain storage area on the floor 12 which accommodates a mass of stored grain. The sidewalls are anchored to a concrete pad 18 which extends around the periphery of the grain storage area.

While FIG. 1 illustrates a rectangular storage and aeration system 10, it should be understood that other shapes may be used. Also, the sidewalls 16 can be made any length to achieve the desired capacity for the storage system. By way of illustration only, a rectangular storage system may be 150 feet by 300 feet and have walls which are five feet three inches high. Such a system has a capacity on the order of 600,000 bushels.

FIGS. 2 and 3 illustrate the forced aeration system which provides air flow through the grain mass. A first set of perforated aeration ducts 20 extend across the floor 12 of the storage system 10. These lower aeration ducts 20 are placed in spaced relation to each other; thus, when the storage and aeration system is filled, the ducts are at the bottom of the grain mass. The lower aeration ducts 20 extend through the sidewalls 16, as shown in FIG. 3, and the portions of the ducts 20 on the exterior of the sidewalls are connected to exhaust fans 21.

After the grain storage and aeration system 10 has been filled with grain, a set of light-weight perforated plastic aeration ducts 22 is laid across the top of the grain. These upper aeration ducts extend slightly beyond the upper edges of the sidewalls 16 so that the ends of the ducts are exposed to air outside of the storage structure. As shown in FIG. 2, the upper ducts 22 are staggered in relation to the lower ducts 20 so that air flowing through the grain mass is circulated generally throughout the grain. After the upper aeration ducts 22 are put in place, a heavyduty cover, such as a tarpaulin 24, is installed over the top of the grain and over the upper aeration ducts 22, and is securely fastened to the top of the sidewalls 16. Alternatively, the perforated ducts 22 may be fastened to the tarpaulin 24 in the desired pattern so that both the ducts and the tarp can be installed over the grain at the same time.

With the cover 24 securely in place, the exhaust fans 21 are turned on. Air is then pulled through the perforated sidewalls 16, through the grain, and out through the ducts 20 to aerate a portion of the grain adjacent the walls 16. Air is also pulled into the open ends of the upper aeration ducts 22. This air moves through the perforations in the ducts 22, downwardly through the grain under the tarp, and out through the ducts 20 to aerate the balance of the grain. As mentioned above, the staggered arrangement of the two sets of ducts 20 and 22 ensures a flow of air throughout the grain mass, an air flow which is adequate to dry the grain and to protect the grain quality. The air movement is indicated by the arrows in FIGS. 2 and 3. While the system is shown and described as having exhaust fans connected to the lower aeration ducts 20 so that air is pulled from the sidewalls 16 inwardly through the grain and from the top ducts 22 down through the grain, it will be understood that the exhaust fans could be connected to the upper aeration ducts 22 and then the air flow would be the reverse of that shown. Further, blowers for forcing air into the grain can be used instead of exhaust fans pulling air through the grain, if desired. However, exhaust (suction) fans are usually preferable.

FIG. 4 shows the construction of one of the sidewalls 16 in greater detail. The sidewall is supported by a series of trusses 14 which, typically, may be spaced thirty inches apart. The sidewall itself comprises a plurality of longitudinal wall members 26. These members 26 interlock with adjoining wall members and are attached to the trusses 14 in a manner which will be described below.

FIG. 4 shows a section 28 of the sidewall 16 which can be used as a door to provide access to the interior of the storage structure of the system 10. The door section 28 is separated from the rest of the wall at joints 30. When the door section 28 is closed the joints 30 are covered by flashing members 32. The door section 28 includes a pair of short auger tubes 34 which extend through the door to the interior of the storage structure (see FIGS. 4 and 5). Each auger tube 34 includes a flashing 36 which closes the peripheral portion of the opening through the door. The tubes are normally closed by removable covers 35. When it is desired to remove grain from the storage structure of the system 10, the covers 35 are removed and augers are inserted through the tubes 34. The augers extract grain from the area immediately adjacent the door section 28. Once the grain next to the door has been removed, those trusses 14 that support the door section 28 can be disconnected from their anchor bolts and the door 28 can be removed. This provides access to the remainder of the grain which can be unloaded by a front loader, for example.

Details of the support trusses are shown in FIGS. 5–8. Each support truss 14 includes a main beam 38, a base 40, and a brace 42. These parts are welded together in the A-frame configuration shown. The main beam 38 preferably comprises a C-section channel made of sixteen-gauge steel having a six inch base 39A and two and one-half inch side-walls 39B. The open side of the channel is closed by a tab strip 44 (FIG. 7) which is preferably welded to the beam. The completed main beam 38 has a rectangular cross section. The wall members 26 are attached to the tab strip 44 as explained below.

At the top of the main beam 38 is a bracket 46 which closes the end of the beam and provides a mounting location for a wooden nailing strip 48. The nailing strip 48 is used to secure the tarp 24 to the storage structure. In a preferred embodiment the main beam 38 is disposed at an angle A of about 50° from the horizontal. As previously noted, the height H of the sidewalls is preferably about five feet three inches. The inclined sidewall has the advantage of increasing the available storage area and it minimizes dripping and rain splash. This is because the slanted walls are essentially completely covered by the tarp or like cover 24 and thus are protected from rain, snow, etc. Since the walls are perforated this inclined construction assists in preserving the quality of grain near the sidewalls by preventing access of rain or other precipitation.

Both the base 40 and the brace 42 in each truss 14 are preferably made of sixteen-gauge steel, formed in Z-U sections. Thus, the same manufacturing equipment can be used to fabricate both of these parts. Another advantage of this form of section is the parts can be conveniently stacked and loaded for shipping. The base 40 of each truss 14 is secured to the foundation 18 by suitable means such as the anchor bolts 50.

FIG. 9 illustrates a preferred construction for a joint between two intersecting sidewalls 16. The wall members 26 are cut to variable lengths, the members becoming progressively longer from the bottom of the wall to the top. This arrangement fills in most of the corner, but there are still small gaps between abutting wall members 26. These gaps are covered by a sheet metal flashing 52. This method of making corners in the sidewalls eliminates the need for closely fitting the wall portions together and thus reduces the cost of the storage system.

FIGS. 10–12 show additional details of the configuration of the wall members 26 and the preferred arrangement for attaching those members to the support trusses 14. Each wall member 26, which may be of any desired length, includes a central surface portion 54 formed integrally with a depending male support channel 56 at one side of the wall member and a depending female support channel 58 at the opposite side of the wall member. When the wall is installed, the male support channel 56 of one wall member 26 fits into the female support channel 58 of an adjacent similar wall member, as shown particularly in FIG. 11. The central surface portion 54 of each wall member 26 may have an upwardly arched configuration to strengthen the wall member. The central portion 54 also includes a multiplicity of narrow ventilation slits or holes 55. The wall members 26 are formed of sheet metal, usually galvanized sheet steel. Typically, the stock from which the wall members 26 are fabricated comprises galvanized sheet steel having a thickness of approximately 0.038 to 0.039 inches.

This material is strong enough for most grain applications; of course, a heavier or lighter sheet metal stock may be employed depending upon the end use requirements. A preferred method of manufacture of the wall members is shown and described in the copending application of Robert Simmons, Ser. No. 287,291, filed July 27, 1981 Pat. No. 4,418,558.

The male and female support channels 56 and 58 extend through notches 60 formed in the tab strip 44 (FIGS. 10 and 11). A lock-tab 62 overlies the support channels 56 and 58 to retain the support channels within the notch 60. Before installation of the wall members on the trusses 14, the lock-tab is in the bent out position shown in FIG. 12. The wall members 26 are then laid in, from the bottom of the support truss up, and the tabs are bent in line with the tab strip (thumb pressure is adequate) to lock the wall members in place on each truss.

The interlocking male and female channel sections 56 and 58, together with the lock-tabs 62, effectively prevent lateral (vertical) movement of the side wall members 26. However, to prevent longitudinal slippage of the wall members, the members are fastened to the support trusses 14 at the butt joints 63 where any two wall members meet, end-to-end. This is best shown in FIGS. 13 and 14. At the joint 63A between two wall members 26A and 26B, screws 64 fasten the wall members to the support truss main beam 38. It will be noted in FIG. 14 that the wall member 26A is connected by the screws to the wall members 26C and 26D, above and below it, respectively, as well as to the truss beam 38. There is no connection between the abutting members 26A and 26B.

FIG. 15 illustrates a preferred construction for the lower aeration ducts 20 of the system 10. In this construction the duct 20A is of triangular configuration, formed by two perforated panels 68. The panels 68 are each formed of the same perforated wall members 26 that make up the sidewalls 16. The panel members of the duct are mounted on a plurality of inverted V-shape supports 72; the mounting arrangement may be the same as used in the sidewalls (see FIGS. 10-12). This duct structure provides a strong duct which can withstand the weight of the grain mass. It has the advantage that the side panel members of the duct have the same configuration as the wall members of the sidewalls. Thus, conventional sheet metal ducts need not be fabricated or supplied. The cost of construction for the duct 20A is much less than a conventional perforated sheet metal duct, whether of circular or rectangular cross-sectional configuration. Moreover, the panel members 26 and the supports 72 are readily stacked for shipment to the site of the grain storage and aeration system 10.

I claim:

1. A grain storage and aeration system for protecting a mass of stored grain, comprising:

a floor underlying a grain storage area for accommodating a mass of grain;

a series of free-standing support trusses at spaced locations around the periphery of the floor, each support truss having a base, a main beam, and a brace fastened together in an A-frame configuration;

a plurality of perforated sheet metal sidewalls mounted on the trusses, and enclosing the floor;

a first set of perforated aeration ducts extending across the floor in spaced relation to each other, at the bottom of a grain mass deposited on the floor;

a second set of perforated aeration ducts extending across the top of the grain mass;

a flexible cover secured to the side walls, and overlying the grain mass and the second set of aeration ducts, the cover and the second set of aeration ducts being supported by the grain mass; and fan means connected to one set of the ducts to circulate air through both sets of ducts, through the sidewalls and through the grain mass, thereby aerating the entire grain mass.

2. The grain storage system of claim 1 wherein the sidewalls are disposed at an angle such that the sidewalls are substantially entirely underneath the cover.

3. The grain storage system of claim 2 wherein the base and brace are both Z-U section members.

4. The grain storage system of claim 2 wherein the main beam is a C-channel, the open side of the C-channel being closed by a tab strip having notches formed therein for receiving the sidewalls.

5. The grain storage system of claim 1 or claim 4 wherein each side wall comprises a plurality of interlocking perforated sheet metal wall members.

6. The grain storage system of claim 5 wherein each wall member comprises a central surface portion, an integral, depending male support channel at one side of the central surface, and an integral, depending female support channel at the opposite side of the central surface, the male support channel of one wall member fitting into the female support channel of an adjacent wall member to interlock the two wall members together.

7. The grain storage system of claim 1 wherein a portion of a sidewall is a door portion, readily removable from the rest of the sidewall, to provide access to the interior of the system.

8. The grain storage system of claim 7 and further comprising at least one opening in the door portion through which grain can be removed by means of an auger to allow opening of the door.

9. The grain storage system of claim 1 wherein the two sets of aeration ducts are staggered with respect to one another to ensure air flow throughout the grain mass.

10. The grain storage system of claim 1 wherein the aeration ducts of the first set each comprise a pair of perforated panels mounted on a plurality of inverted V-shape supports disposed on the floor.

11. The grain storage system of claim 1 wherein the aeration ducts of the first set each comprise two elongated, perforated sheet metal panels mounted on opposite sides of a plurality of inverted V-shape supports, the panels defining an enclosure within the grain storage structure, each panel including at least two interlocking perforate wall members.

12. The grain storage system of claim 11 wherein each wall member includes a central surface portion, an integral, depending male support channel at one side of the central surface, and an integral, depending female support channel at the opposite side of the central surface, the male support channel of one wall member fitting into the female support channel of an adjacent wall member to interlock the two wall members together.

* * * * *